United States Patent [19]
Clarkson

[11] 4,007,911
[45] Feb. 15, 1977

[54] PACKINGLESS GATE VALVE AND ACTUATOR ASSEMBLIES

[75] Inventor: Curtis W. Clarkson, Palo Alto, Calif.

[73] Assignee: The J. R. Clarkson Company, Palo Alto, Calif.

[22] Filed: Apr. 24, 1975

[21] Appl. No.: 571,274

Related U.S. Application Data

[62] Division of Ser. No. 459,949, April 11, 1974, Pat. No. 3,945,604.

[52] U.S. Cl. .................... 251/233; 251/231; 251/326; 138/94.3
[51] Int. Cl.[2] ............... F16K 3/312; F16K 3/32
[58] Field of Search ......... 217/231, 233, 326, 329, 217/232; 138/94.3

[56] References Cited
UNITED STATES PATENTS

| 1,037,338 | 9/1912 | Scott | 251/231 X |
|---|---|---|---|
| 1,881,367 | 10/1932 | McKesson | 251/231 |
| 2,000,494 | 5/1935 | Nordstrom | 251/231 X |
| 2,524,343 | 10/1950 | Diener | 251/231 X |
| 2,669,416 | 2/1954 | Hilton | 251/329 X |
| 2,885,174 | 5/1959 | Setka | 251/329 X |
| 3,198,484 | 8/1965 | Martindale | 251/329 |

FOREIGN PATENTS OR APPLICATIONS

| 826,997 | 11/1969 | Canada | 251/232 |
|---|---|---|---|
| 10,045 | 1844 | United Kingdom | 251/233 |

Primary Examiner—Arnold Rosenthal
Attorney, Agent, or Firm—Strauch, Nolan, Neale, Nies & Kurz

[57] ABSTRACT

A packingless gate valve actuator assembly having a stepped through passage defined by respective half housings formed with passages of different diameter and respective bolt connector flanges disposed in face to face relation with spacer strips interposed between diametrically opposite flange face margins to define a laterally related gate passage, a compressible elastomeric liner sleeve fitted to the passage of greater diameter with its opposite ends protruding axially from the passage ends and the end opposed to the flange face defining the end of the smaller diameter passage formed to span the gate passage and provide a protruding lip sealingly engaging the last mentioned flange face in annular surrounding relation to the smaller diameter passage end, a gate having a leading knife edge slidingly mounted in the gate passage with the lead tip of the knife edge disposed to enter the line of seal and deform the lip into sealing engagement with the opposed face of the knife edge and gate in its reciprocal movement in the gate passage, an actuator lever selectively pivoted upon an extension of one of the spacer strips and pivotally connected to the gate to effect controlled movement of the gate between its open and closed positions.

12 Claims, 4 Drawing Figures

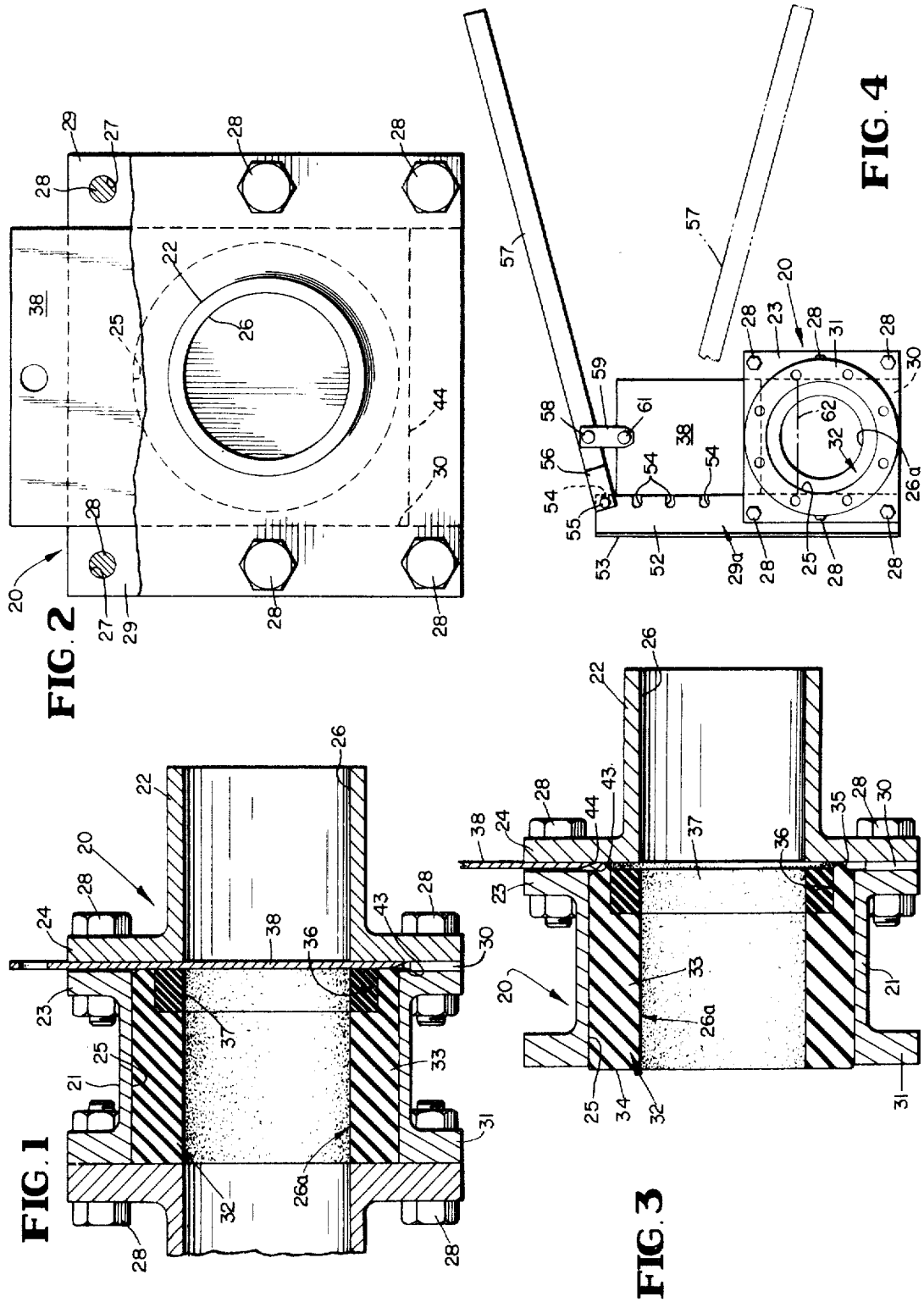

4,007,911

PACKINGLESS GATE VALVE AND ACTUATOR ASSEMBLIES

This is a division of application Ser. No. 459,949 filed Apr. 11, 1974, now U.S. Pat. No. 3,945,604.

BACKGROUND OF INVENTION

The present invention relates in general to an improvement in gate valves which assures full through flow with no line obstruction when fully open and eliminates the need of packing, stuffing boxes, and packing glands to prevent leakage in any of its selected control positions whether used as an in-line shut-off valve or as a spigot or take-off point valve mounted on the side of a pipeline. While intended primarily for the control of abrasive slurries, including tailings, spigotting, hydrocyclone feed shut-off valving, slurry pump isolation, and dump valve applications, the valve can be used wherever gate valve control may be desired to close against line pressures up to 100 pounds per square inch. It further provides a face-to-face dimension equal to that of a standard 125 lb. gate valve, employees an inlet flange connection meeting 150 lb. ASTM-A181 Grade 1 Specifications and optional outlet connections of flange, Victaulic or plain end type meeting these same specifications. A special lever actuator is provided.

SUMMARY OF INVENTION

A principal object of the present invention resides in the provision of a novel combination gate valve and lever actuator assembly of mechanically simple construction and easy to install and operate.

A further important object of the present invention resides in the provision of a novel gate valve and lever actuator assembly wherein two housing members are secured in fixed relation with spacers therebetween to define space for a transversely slidable gate, and one of the spacers is extended to provide a plurality of selective pivot attachment positions for a lever that is operatively connected to the slidable gate.

BRIEF DESCRIPTION OF THE DRAWINGS

Further objects will appear from the following description and appended claims when read in conjunction with the accompanying drawings wherein:

FIG. 1 is a longitudinal section through a typical valve constructed in accord with this invention showing the gate in fully closed position and omitting therefrom any illustration of a gate actuator;

FIG. 2 is an end elevational view of the valve of FIG. 1 as viewed from the right end of FIG. 1;

FIG. 3 is a longitudinal sectional view similar to FIG. 1 showing the sealing sleeve in full sealing engagement with the flange face of the right end half housing with the gate leading edge disposed in its fully open position; and FIG. 4 is a left end elevational view of the valve of FIG. 1 assembled with a lever actuator in accord with this invention.

DESCRIPTION OF PREFERRED EMBODIMENT

With continued reference to the drawings wherein the same reference numerals are employed throughout the several views to indicate the same parts, numeral 20 generally designates the improved gate valve of this invention. Gate valve 20 is made up of a pair of half housings 21 and 22 provided at their adjacently connected ends with respective bolt connector flanges 23 and 24 and respectively defining through longitudinal passages 25 and 26. As best seen in FIGS. 1 and 3, the passages 25 and 26 are centered with relation to the flange edges and passage 25 of half housing 21 is of greater diameter than passage 26 of housing half 22 the purpose of which will be hereinafter pointed out.

Referring to FIG. 2, bolt connector flanges 23 and 24, laterally outwardly of passage 25 of greater diameter, are provided with oppositely laterally aligned bolt passages 27 for receiving the shanks of respective nut and bolt assemblies 28 to clampingly draw the connector flanges 23 and 24 into face butting engagement with respective steel spacer strips 29 extending the full length of the lateral marginal portions of flanges 23 and 24. Preferably the spacer strips are of a thickness approximating 0.03 times the overall length of the sleeve liner presently to be described and a width to extend laterally inwardly from the opposite lateral edges of flanges 23 and 24 a short distance past bolt passages 27 and are provided with bolt passages disposed to align with bolt passages 27 of flanges 23 and 24. When the nut and bolt assemblies 28 are fully tightened, the spacer strips form between them a gate passage 30 open at its upper and lower ends as viewed in FIGS. 1 and 2, closed throughout the full length of the opposed lateral flange edges, and having a thickness in the axial direction of the stepped through passage defined by the axially spaced passages 25 and 26 of the assembled housings (See FIGS. 1 and 3) equal to the thickness of strips 29.

The opposite free ends of the assembled half housings 21 and 22 may be variously formed adapting the assembled structure for connection to any of the generally used pipeline connector fittings, for example 150 lb. ASTM flange ("J" Dia. Through bolts), plain nipple, victaulic nipple. In the preferred embodiment disclosed in the accompanying drawings, the opposite free end of housing half 21 is illustrated with a 150 lb. ASTM flange 31 with through bolt passages while the opposite free end of housing half 22 illustrates a plain nipple connector.

Turning to FIGS. 1 and 3, sealing of the gate valve of this invention is accomplished by means of a simple liner sleeve 32 slidably fitted into passage 25. As best seen from FIG. 3, illustrating the gate valve 20 in its fully open position before installation in a pipeline, sleeve 32 comprises a primary cylindrical body 33 of a soft elastomeric material (for example soft rubber of 45–50 Durometer on the Shore A scale). The upstream end 34 of sleeve 32 protrudes slightly from passage 25 of half housing 21 while the downstream end is externally circumferentially chamferred and internally recessed to form an axially protruding, flexible, annular sealing lip 35 of triangular cross section and a length to span gate passage 30 and abuttingly engage the opposing face of connector flange 24 in surrounding relation to the upstream end of passage 26 of half housing 22. The internal recess includes a cylindrical counterbore 36 longitudinally inset from lip 35 and mounting in surface bonded relation an annular rigidifying ring 37 of elastomeric material (for example a hard rubber of 95–100 Durometer hardness on the Shore A scale). Rigidifying ring 37 is provided to prevent bodily inward deformation of soft rubber ring body 32 immediately adjacent the base of lip 35 during opening and closing movement of a plate-like gate 38 of tough abrasion and corrosion resistant material, for example, stainless steel dimensioned to snugly slidingly fit gate passage 30. Ring 37 and sleeve 32 cooperate to define a flow passage 26a of a diameter equal to passage 26 communicating with the upstream face of gate passage 30.

As will be clear from a consideration of FIG. 1, the valve 20, when installed for use, is disposed in the line of flow from a pipeline flow passage 41 of a diameter equal to the smaller through passage 26 of half housing 22 which forms the downstream end of valve 20. As a consequence, when the valve 20 is drawn up by flange connector bolts 28 (FIG. 1), the rubber sleeve 33, due to its end butted engagement between face 42 (FIG. 1) of the pipeline fitting or flange and the face of connector flange 24 outwardly of passage 26, will be axially compressed into fluid tight sealing engagement at its opposite ends. As a consequence, leakage through gate passage 30 is prevented by the annular sealing lip 35 in the fully open position of the valve.

As best seen in FIG. 3, the leading end of plate-like gate 38 in the fully open valve position is disposed outwardly of annular sealing lip 35 and is formed to provide a knife edge 43. The tip 44 of knife edge 43 slidingly edges the face of connector flange 24 during its closing and opening movement and its bevelled upstream face is preferably inclined to define a minimal included tip angle. As gate 38 moves inwardly toward its closed position the knife edge tip 44 enters between the compressed sealing lip 35 and the opposing face of connector flange 24 progressively cammingly further compressing the soft deformable lip 35 into sealing engagement with the bevelled upstream knife edge face and finally the upstream planar face of gate 38. Due to the unique construction of lip 35 and the knife edge 43 of gate 38, a positive sealing engagement of sealing lip 35 in spanning relation to the entering knife edge 43 as well as the adjacently related end face of connector flange 24 and the entering upstream face of gate 38 is maintained at all times during closing and opening movement of gate 38.

It will furthermore be appreciated that the close sliding fit of gate 38 in gate passage 30 assures entry of knife edge 43 along the line of contact between lip 35 and the opposed face of connector flange 24 with its tip 44 in scraping contact with the face of connector flange 24. As a consequence, any corrosive or adherent matter that may be present on the opposed face of connector flange 24 will be scraped free during closing movement of the gate conditioning the flange face for proper sealing cooperation with lip 35 during its next opening movement. Also, since the sole leakage path of applicant's valve 20 lies between the compressed sealing lip 35 and the upstream face of connector flange 24 or the bevelled face of knife edge 43 and the upstream face of gate 38, the annular internal seal provided by the present invention obviates any need of packing, stuffing boxes, or packing glands for externally sealing the gate passage.

DESCRIPTION OF ACTUATOR

Referring to FIG. 4, an effective lever actuator is provided by providing a spacer strip 29a in the form of an angle iron. Flange 52 of angle iron 29a is of a thickness to serve as the left side spacer strip, of a width to extend outwardly beyond the left edge of connector flanges 23 and 24 to right angularly directed strengthening flange 53, and of a length approximately twice that of spacer strips 29. The inner edge of flange 52 disposed in guiding relation to the left edge of gate 38 as seen in FIG. 4 is provided with a series of spaced U-shaped notches 54 formed to journal a cross shaft 55 carried by the bifurcated end 56 of an actuator lever 57. Inwardly from end 56 lever 57 at 58 a depending link 59 the opposite end of which is fitted with a removable pivot pin 61 is provided adapting the opposite end of link 59 for connection to the outer end of gate 38 along its longitudinal center line upon fitting cross shaft 55 into a selected notch 54. Assuming gate 38 to be fully open as illustrated in FIG. 4, cross shaft 55 would be fitted to the outermost notch 54 and lever 57 would be rocked into position to align the pin passage at the opposite end of link 59 with the pin passage in the outer end of gate 38 and pivot pin 61 would be inserted to connect actuator lever 57 as shown in FIG. 4. In this position, the axis of shaft 55 lies in a horizontal plane bisecting the arc passing through the centers of pivots 58 and 61. Downward pressure applied to the free end of lever 57 will be applied to gate 38 through pivot pin 61 along the longitudinal center line of gate 38 to advance gate 38 toward its closed position a distance substantially equal to the distance between the centers of pivots 58 and 61. This movement will position the leading edge of gate approximately at the dot-dash line position 62 of FIG. 4 restricting through flow to about three-fourths of full flow. If further restriction of through flow is desired, pin 61 may be removed, shaft 55 may be fitted into the next lower notch 54, and pin 61 may be replaced to connect lever 57 for further inward movement of gate 38 to its half closed position or any desired increment of closure between three-fourths flow and half flow. It will be appreciated from the foregoing description of operation that the lever actuator may be employed to secure any desired through flow between full flow and no flow and that a single lever actuator may be employed to service any number of valves 20 fitted for lever operation.

The link 59 of FIG. 4 may be provided with a slot connection (not shown) to pin 61 whereby initial rocking of lever 57 toward either valve open or closed position will embody a freely movable lost motion phase resulting in an effective hammer blow being delivered to the gate member 38 and this aids in freeing sticky valve conditions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a gate valve and actuator assembly, a valve housing having a through fluid flow passage, means defining a transverse gate valve chamber in said housing, a gate valve member slidably mounted in said chamber between positions where it permits or blocks flow through said passage, an actuator operably connected to said gate valve member, and means providing a plurality of adjacent spaced sockets in a row on said housing each disposed at a different distance from said passage and adapted to detachably pivotally receive an end of said lever whereby said lever may be selectively pivotally mounted on said housing at any of a plurality of different distances from said passage for effecting staged displacement of said valve member in said passage.

2. In the gate valve and actuator assembly defined in claim 1, said lever having a pivot formation at one end for mounting in a housing socket, and the operative connection between the lever and gate member being a rigid link pivoted at opposite ends to said lever and gate member.

3. In a gate valve and actuator assembly, a valve housing having a through fluid flow passage, means defining a transverse gate valve chamber in said housing, a gate valve member slidably mounted in said chamber between positions where it permits or blocks flow through said passage, and an actuator lever pivotally mounted on said housing for rocking about an axis substantially parallel to the direction of flow in said passage and operably connected to said gate valve member, said valve housing comprising housing members rigidly connected together with relatively thin spacer strips at opposite sides of said passage disposed between the housing members and defining said gate chamber, and said housing members having connector flanges between which said spacer strips are clamped with one of said spacer strips projecting from said housing, said gate member being plate-like and slidably guided by said strips, and said lever being pivotally mounted at one end on said one spacer strip and being intermediately pivotally connected to the trailing end of said plate-like gate member.

4. The assembly defined in claim 3, wherein said one of said spacer strips extends laterally outwardly from said connector flanges past the trailing end of said plate-like gate member in edge guiding relation to the adjacent edge of said gate member, said extending portion of said one spacer strip along its guiding edge is provided with a series of longitudinally spaced substantially U-shaped notches, and said actuator lever is bifurcated at one end to freely receive said guiding edge of said extending portion of said one spacer strip and mounts in spanning relation a pivot shaft adapted to be selectively positioned in any of said respective notches to establish a fulcrum mounting of said lever in a selected notch and a link is pivotally connected at one end to said lever inwardly from said one end of said lever and pivotally connected at its opposite end to said plate-like gate member adjacent the trailing end of said gate adapting said lever, upon rocking movement of said lever about its pivot shaft in successive selected notches, to impart staged lateral inward or outward movement of said plate-like gate member in said gate chamber.

5. The combination of claim 4 wherein the connection of said link to said plate-like gate member is effected through a removable pivot pin adapting said lever for ready connection and disconnection to said plate-like gate number whereby a single actuator lever may be readily disconnected and employed as the actuator lever for a number of valves.

6. The assembly of claim 4 wherein one of the pivotal connections of said link connecting said lever and said plate-like gate member includes a slot slidingly receiving a connector pin, said slot being sufficiently long as compared to the diameter of said connector pin to assure, upon a change in directional oscillation of said lever, an increment of free movement of said link terminating in delivery of a hammer blow to break loose a stuck gate member.

7. In a gate valve and actuator assembly, a valve housing having a through fluid flow passage, means defining a transverse gate valve chamber in said housing, said valve housing comprising housing members rigidly connected together with spacer means at opposite sides of said passage disposed between the housing members and defining said gate chamber, a gate valve member slidably mounted in said chamber between positions where it permits or blocks flow through said passage, and an actuator lever pivotally mounted on said housing for rocking about an axis substantially parallel to the direction of flow in said passage and operably connected to said gate valve member, one of said spacer means projecting from said housing and being formed with at least one socket for pivotally mounting said lever.

8. In the gate valve and actuator assembly defined in claim 7, said one spacer means being a substantially flat metal strip clamped between said housing members and said socket being an opening in an edge of said strip.

9. In the assembly defined in claim 7, there being a plurality of said sockets spaced at different distances from said housing and said lever being selectively pivotally mountable in any of them.

10. In a gate valve and actuator assembly, a valve housing comprising two housing members rigidly connected together and having a through fluid flow passage, means defining a transverse gate valve chamber in said housing comprising two flat metal spacer strips of the same thickness clamped between said housing members and laterally defining said chamber between their opposed edges, a thin flat gate valve member having a thickness substantially equal to that of said strips slidably mounted in said chamber between positions where it permits or blocks flow through said passage, one of said strips projecting beyond said housing members and being formed with an edge socket, and an actuator lever having one end detachably pivotally disposed in said socket whereby said lever may be pivotally mounted on said housing for rocking about an axis substantially parallel to the direction of flow in said passage and said lever being operably connected to said gate valve member.

11. In a gate valve and actuator assembly, a valve housing having a through fluid flow passage, a rigid extension on said housing, means defining a transverse gate valve chamber in said housing, a gate valve member slidably mounted in said chamber between positions where it permits or blocks flow through said passage, an actuator operably connected to said gate valve member, and a row of open sided recesses along said housing extension each adapted to detachably pivotally receive said lever whereby said lever may be selectively pivotally mounted on said housing at any of a plurality of different distances from said passage for staged displacement of said valve member.

12. In the gate valve and actuator assembly defined in claim 11, said lever having at one end a pivot shaft selectively fitting into any one of said recesses, and said lever being pivotally connected to said gate member.

* * * * *